(12) United States Patent
Rasheed

(10) Patent No.: US 10,628,981 B2
(45) Date of Patent: Apr. 21, 2020

(54) TECHNIQUES FOR EDITING VECTOR GRAPHICS DOCUMENTS

(71) Applicant: Adobe Inc., San Jose, CA (US)

(72) Inventor: Fabin Rasheed, Alleppey (IN)

(73) Assignee: Adobe Inc., San Jose, CA (US)

( * ) Notice: Subject to any disclaimer, the term of this patent is extended or adjusted under 35 U.S.C. 154(b) by 57 days.

(21) Appl. No.: 15/619,228

(22) Filed: Jun. 9, 2017

(65) Prior Publication Data

US 2018/0357801 A1 Dec. 13, 2018

(51) Int. Cl.
| | |
|---|---|
| G06T 11/60 | (2006.01) |
| G06K 9/00 | (2006.01) |
| G06K 9/20 | (2006.01) |
| G06K 9/46 | (2006.01) |
| G06K 9/32 | (2006.01) |
| G06T 11/20 | (2006.01) |

(52) U.S. Cl.
CPC .......... G06T 11/60 (2013.01); G06K 9/00476 (2013.01); G06K 9/3241 (2013.01); G06T 11/203 (2013.01); G06T 2200/24 (2013.01)

(58) Field of Classification Search
None
See application file for complete search history.

(56) References Cited

U.S. PATENT DOCUMENTS

| | | | | |
|---|---|---|---|---|
| 5,133,052 A * | 7/1992 | Bier | ..................... | G06K 9/6203 345/619 |
| 8,892,995 B2 * | 11/2014 | Hoppenot | ............... | G06F 17/00 715/255 |
| 2005/0022116 A1 * | 1/2005 | Bowman | ........... | G06F 17/30896 715/234 |
| 2006/0005126 A1 * | 1/2006 | Shapiro | ............... | G06F 17/2247 715/248 |
| 2009/0021754 A1 * | 1/2009 | Cairns | ..................... | G06K 15/02 358/1.9 |
| 2012/0192046 A1 * | 7/2012 | Slatter | ................... | G06F 17/211 715/202 |

OTHER PUBLICATIONS epiloglaser.com, "Find and Replace a Color in CorelDRAW", Jul. 17, 2014, https://web.archive.org/web/20140717060410/http://support.epiloglaser.com/article/8205/29944/find-and-replace-a-color-in-coreldraw.*
https://www.youtube.com/watch?v=Z6WixrkwYQ0, "Find and Replace Objects in CorelDraw", May 7, 2007.*

* cited by examiner

*Primary Examiner* — Tize Ma
(74) *Attorney, Agent, or Firm* — Kilpatrick Townsend & Stockton LLP (57) ABSTRACT

Disclosed herein are embodiments for automatically editing vector graphics documents. A computer receives input selecting a vector graphics document to be edited. The vector graphics document specifies a plurality of graphical elements. Additional input is received that specifies (i) a target element to be identified in the vector graphics document and (ii) an insertion element to be inserted into the vector graphics document. The computer identifies the graphical elements in the vector graphics document that match the target element by comparing a plurality of parameters that define the target element to the parameters that define the respective graphical elements in the vector graphics document. The computer inserts instances of the insertion element proximate to positions of the graphical elements in the vector graphics document that match the target element.

19 Claims, 7 Drawing Sheets

TECHNIQUES FOR EDITING VECTOR GRAPHICS DOCUMENTS

TECHNICAL FIELD

This disclosure relates generally to editing elements of one or more vector graphics documents. More specifically, but not by way of limitation, this disclosure relates to identifying and replacing elements in electronic vector graphics documents, such as (but not limited to) files produced by Adobe® Illustrator® available from Adobe Systems, Inc. of San Jose, Calif.

BACKGROUND

An electronic vector graphics document can include many different graphical elements that are instantiated from various element types, such as circles, ellipses, lines, polygons, etc. For example, a user draws a simple apple tree using a cylinder for the trunk and a series of lines radiating from the trunk representing branches of the tree. To represent apples on the tree, the user adds 20 copies of a circle having a red fill color and positions the circles adjacent to the lines in various locations around the tree.

While editing such vector graphics documents in a computing device, users often modify particular elements in the vector graphics document. For example, the user modifies the apple tree that they have previously drawn to instead be an orange tree. To do so, the user needs to find all of the red-colored circles representing apples and replace them with orange-colored circles to represent oranges. While a user can perform this edit manually, it is tedious and time-consuming, particularly when the document includes tens, hundreds, or more instances of such an element.

SUMMARY

Various aspects of the present invention relate to automatically editing graphical elements of vector graphics documents by automatically matching target elements with similar elements. In one implementation, a computer receives input from a user selecting a vector graphics document to be edited. The vector graphics document includes multiple graphical elements. The computer receives further input from the user that specifies a target element to be identified in the vector graphics document and an insertion element to be inserted into the vector graphics document.

A computer identifies positions of multiple graphical elements (e.g., some or all) in the vector graphics document that match the target element. The computer matches the target element to a graphical element in the vector graphics document by, for example, comparing a set of parameters that define the target element to a set of corresponding parameters that define the graphical element. Examples of these parameters include vertices, handles, stroke color, fill color, or some combination thereof. In some embodiments, the computer replaces the matching graphical elements in the document with instances of the insertion element. In other embodiments, the computer instead inserts instances of the insertion element proximate to the positions of the graphical elements that match the target element, but does not delete the matching graphical elements from the document.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed herein are various embodiments relating to automatically editing graphical elements of one or more vector graphics documents by automatically matching target elements with similar elements. A computer identifies multiple graphical elements (e.g., some or all) in the vector graphics document that match the target element by, for example, comparing a set of parameters that define the target element to a set of corresponding parameters that define the graphical element. Thereafter, the computer inserts instances of an insertion element proximate to the positions of the graphical elements that match the target element. In some embodiments, the instances of the insertion element replace the matching elements in the document. Thus, the techniques disclosed herein address the issue of making a user perform time-consuming and repetitive edits to a vector graphics document by having a computer automatically edit the document based on specified target and insertion elements.

In an exemplary embodiment, a computer receives input from a user selecting a vector graphics document to be edited, such as a Scalable Vector Graphics (SVG) document. The computer also receives input from the user specifying a reference graphical element by which similar graphical elements in the document will be identified (also referred to as the "target element") and a graphical element with which to replace the elements matching the target element (also referred to as the "insertion element"). Thereafter, the computer extracts various parameters that define the target element, such as the type of element, position of vertices, etc. The computer identifies the graphical elements in the document that match the specified target element by comparing the parameters of the target element (also referred to as a "find vector") to the corresponding parameters that define the graphical elements in the vector graphics document. The insertion element is then used to automatically replace instances of the target element identified in the vector graphics document. In the following discussion, a general description of the system and its components is provided, followed by a discussion of the operation of the same.

As used herein, a "vector graphics document" is a document that includes vector graphics elements, but can also include other components that are not vector graphics based. For example, a document file includes vector graphics elements, in addition to components for raster graphics objects and text data.

Figure 1:
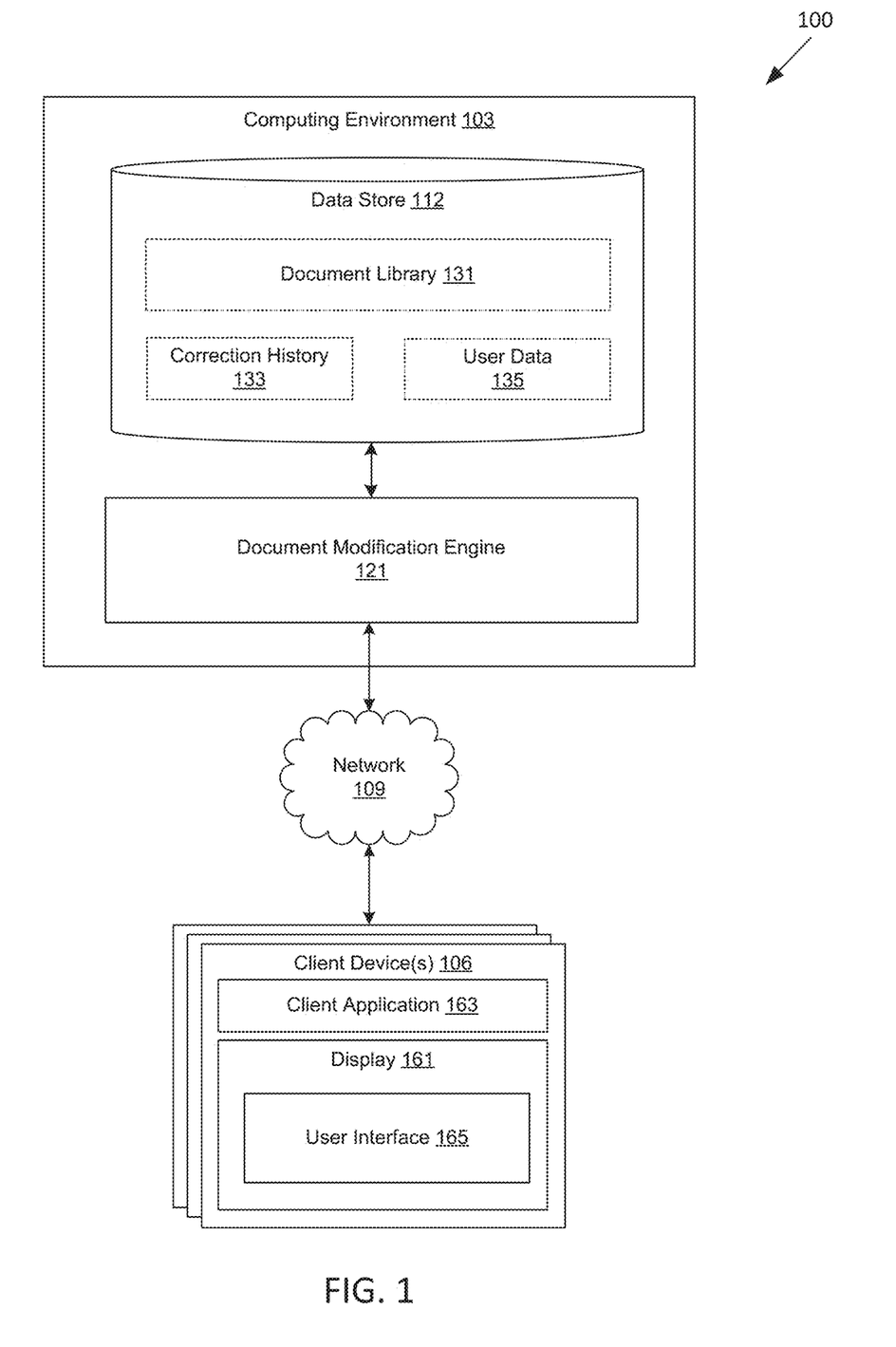
FIG. 1 is a drawing of a networked environment that includes a document modification engine for editing vector graphics documents by matching target elements to similar elements, according to various embodiments of the present disclosure.

With reference to FIG. 1, shown is an illustrative networked environment 100 according to various embodiments. The networked environment 100 includes a computing environment 103 and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks include, for example, satellite networks, cable networks, Ethernet networks, or other types of networks. Although the functionality described herein is shown in the context of the networked environment 100, other implementations are possible, such as implementing the functionality in a single computing device (e.g. desktop computer or mobile device), as a plug-in or auxiliary feature of another service executed in a computing device, and in arrangements of computing devices other than those shown in FIG. 1.

The computing environment 103 includes, for example, a server computer or any other system providing computing capability. Alternatively, in some embodiments, the computing environment 103 employs multiple computing devices arranged, for example, in one or more server banks or computer banks or other arrangements. In some instances, such computing devices are located in a single installation or are distributed among many different geographical locations. For example, the computing environment 103 can include multiple computing devices that together are a hosted computing resource, a grid computing resource, or any other distributed computing arrangement. In some cases, the computing environment 103 corresponds to an elastic computing resource where the allotted capacity of processing, network, storage, or other computing-related resources vary over time.

Various applications and other functionality are executed in the computing environment 103 according to various embodiments. Also, various data is stored in a data store 112 that is accessible to the computing environment 103. In some embodiments, the data store 112 is representative of multiple data stores 112 as can be appreciated. The data stored in the data store 112, for example, is associated with the operation of the various applications and functional entities described below.

The components executed on the computing environment 103, for example, include a document modification engine 121 and other applications, services, processes, systems, engines, or functionality not discussed in detail herein. The document modification engine 121 is executed to automatically edit graphical elements of one or more vector graphics documents based in part upon identifying the target element for which the editing should be performed in the vector graphics document(s).

The data stored in the data store 112 includes, for example, document library 131, correction history 133, user data 135, and potentially other data. The document library 131 includes documents associated with various users of the document modification engine 121, metadata associated with the documents, etc. The documents are stored in various possible formats, such as SVG, Adobe Illustrator (AI), Encapsulated PostScript (EPS), Adobe Flash® (SWF), or other document formats in which vector graphics objects are specified. The metadata for a document includes, for example, an identifier for the application used to create the document, description of the elements used in the document, time/date of creation, thumbnail images, previous versions of the document, or other possible metadata. In some implementations, one or more of the documents are references (e.g., URLs) to documents stored external to the data store 112.

The correction history 133 includes a history of each user's actions associated with the corrections undertaken by the document modification engine 121. The correction history 133 includes, for instance, identifiers of the documents edited by a user using the document modification engine 121, the target or insertion elements used in the edits, any changes made by the user to the automatic edits, acceptance or rejection by the user of the automatically edited documents, a history of the changes made to the documents, or other possible historical data.

The user data 135 includes various data associated with users of the document modification engine 121 or who have documents stored in the document library 131. The user data 135 includes, for example, user credentials, identifiers of documents stored by the user, identifiers of documents created or edited by the user, preferences, or other possible data.

The client 106 is representative of possibly multiple client devices that are coupled to the network 109. The client 106 includes, for example, a processor-based system such as a computer system. Such a computer system is embodied, for example, in the form of a desktop computer, a laptop computer, personal digital assistants, cellular telephones, smartphones, set-top boxes, music players, web pads, tablet computer systems, game consoles, electronic book readers, or other devices with like capability. In some embodiments, the client 106 includes a display 161. The display 161 includes, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client 106 is configured to execute various applications, such as a client application 163 or other applications. The client application 163 is executed in a client 106, for example, to access network content served up by the computing environment 103 or other servers, thereby rendering a user interface 165 on the display 161. To this end, the client application 163 includes, for example, a browser, a dedicated application, etc., and the user interface 165 includes, for example, a network content page, an application screen, etc. In some embodiments, the client 106 is configured to execute applications beyond the client application 163 such as, for example, email applications, social networking applications, word processors, spreadsheets, or other applications.

Next, a general description of the operation of the various components of the networked environment 100 is provided. To begin, a user operating the client 106 employs the client application 163 to establish a communication session with the document modification engine 121. The communication session is carried out using various protocols such as, for example, hypertext transfer protocol (HTTP), simple object access protocol (SOAP), representational state transfer (REST), user datagram protocol (UDP), transmission control protocol (TCP), or other protocols for communicating data over the network 109. In some implementations, the user is authenticated to the document modification engine 121 using one or more user credentials.

Figure 2:
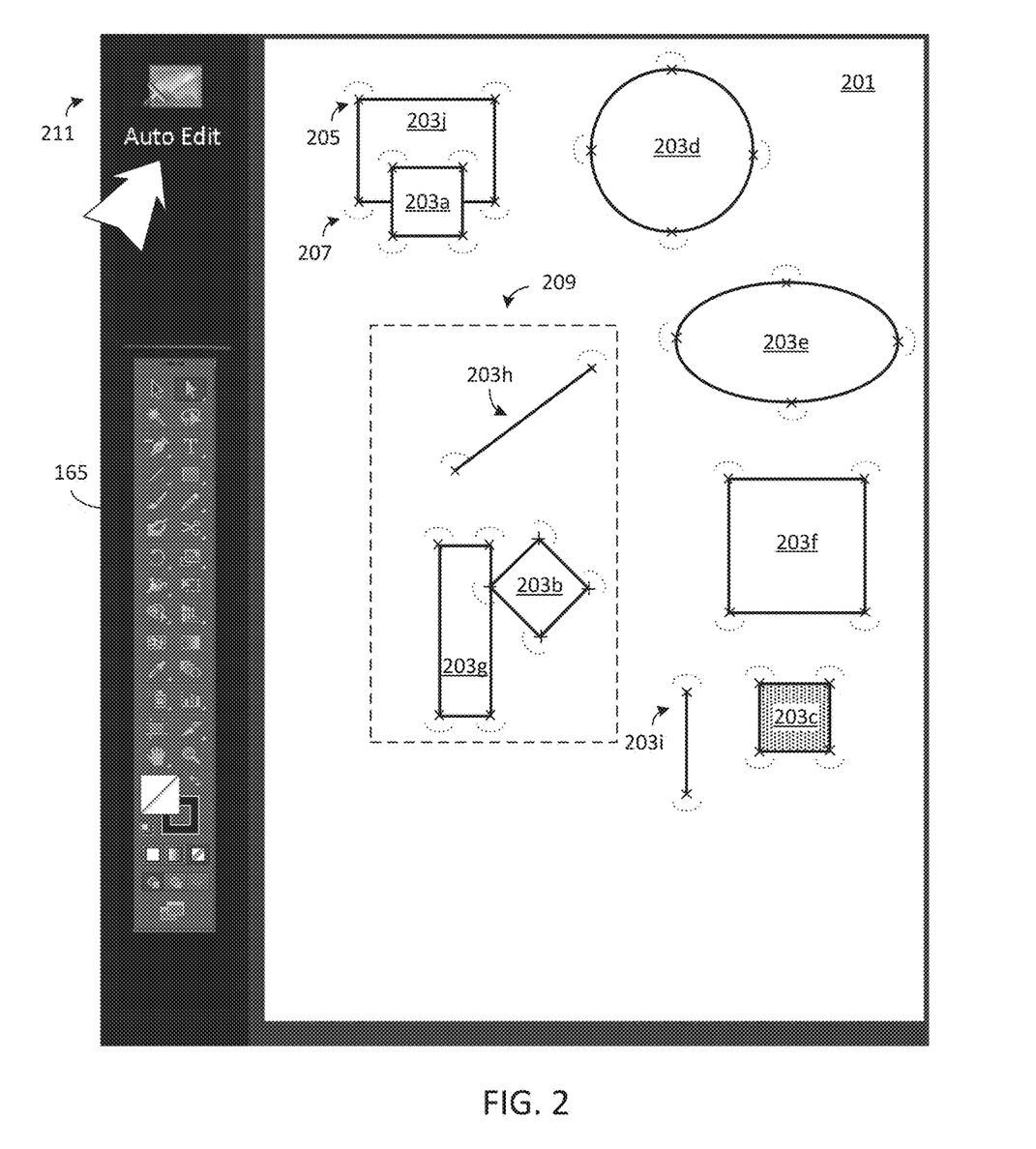
FIG. 2 is a pictorial diagram of an example of a user interface for the document modification engine rendered by a client in the networked environment of FIG. 1 that depicts various graphical elements in a vector graphics document.

Thereafter, the user selects, from the user interface 165, a vector graphics document (simply referred to as a document) to be edited, such as the document 201 shown in FIG. 2. In some embodiments, the selected document is created or modified using the document modification engine 121 or other application, chosen from the preexisting documents from the document library 131 that are associated with the user, uploaded from the client 106 through the user interface 165, or obtained from other possible sources.

The exemplary document shown in FIG. 2 includes various graphical elements 203a-N (also referred to as vectors) that are defined in the document 201. The graphical elements 203 represent an example of the different element types, such as a line (e.g., elements 203h and 203i), ellipse (e.g., elements 203d and 203e), and rectangle (e.g., elements 203a-c, 203g). In some embodiments, other types of vector graphics elements are included in a document 201 instead of or in addition to those shown in FIG. 2, such as points, polygons, text, etc. In addition, each of the elements 203 are defined by various visual characteristics, such as vertices, handles, stroke color, fill color, or other possible characteristics as can be appreciated. Each element 203 will include one or more vertices, such as the vertex 205 of the element 203j, around which the respective element 203 is formed. For example, the element 203j, being a rectangle, is defined by four vertices, one of which is the vertex 205, that are joined by a line (also referred to as a path) that forms the shape of the element 203j. In some embodiments, the position (e.g., (X,Y) coordinates) of each vertex of an element 203 is also be defined. Some or all the vertices of the elements 203 are associated with handles, such as the handle 207, that allow the curve or angle of the line through the respective vertex to be adjusted. The stroke color is the color of the lines that join the vertices of an element 203. The fill color is the color used for the interior of an element, such as the pattern representing a color in element 203c. In some embodiments, other characteristics for the elements 203 are used, such as stroke weight, stroke pattern, fill pattern, opacity, type of vertex, center point, orientation, etc. The element type and visual characteristics of an element 203 are collectively referred to as the "parameters" of an element.

In some instances, the document 201 has one or more element groups (simply referred to as groups) that each have one or more elements 203, such as the group 209 that includes the elements 203b, 203g, and 203h. For illustrative purposes, the group 209 is shown enclosed with a dashed line that will not necessarily appear in an actual presentation of the document 201 in the user interface 165. Grouping of the elements 203 is be used to simplify application of operations to each of the group members, such as changing the stroke color of the elements, moving the elements, etc. In order to initiate the automatic editing operations for the document 201, a user selects the feature from the user interface 165, such as selecting the "Auto Edit" icon 211 using the pointer shown.

Figure 3:
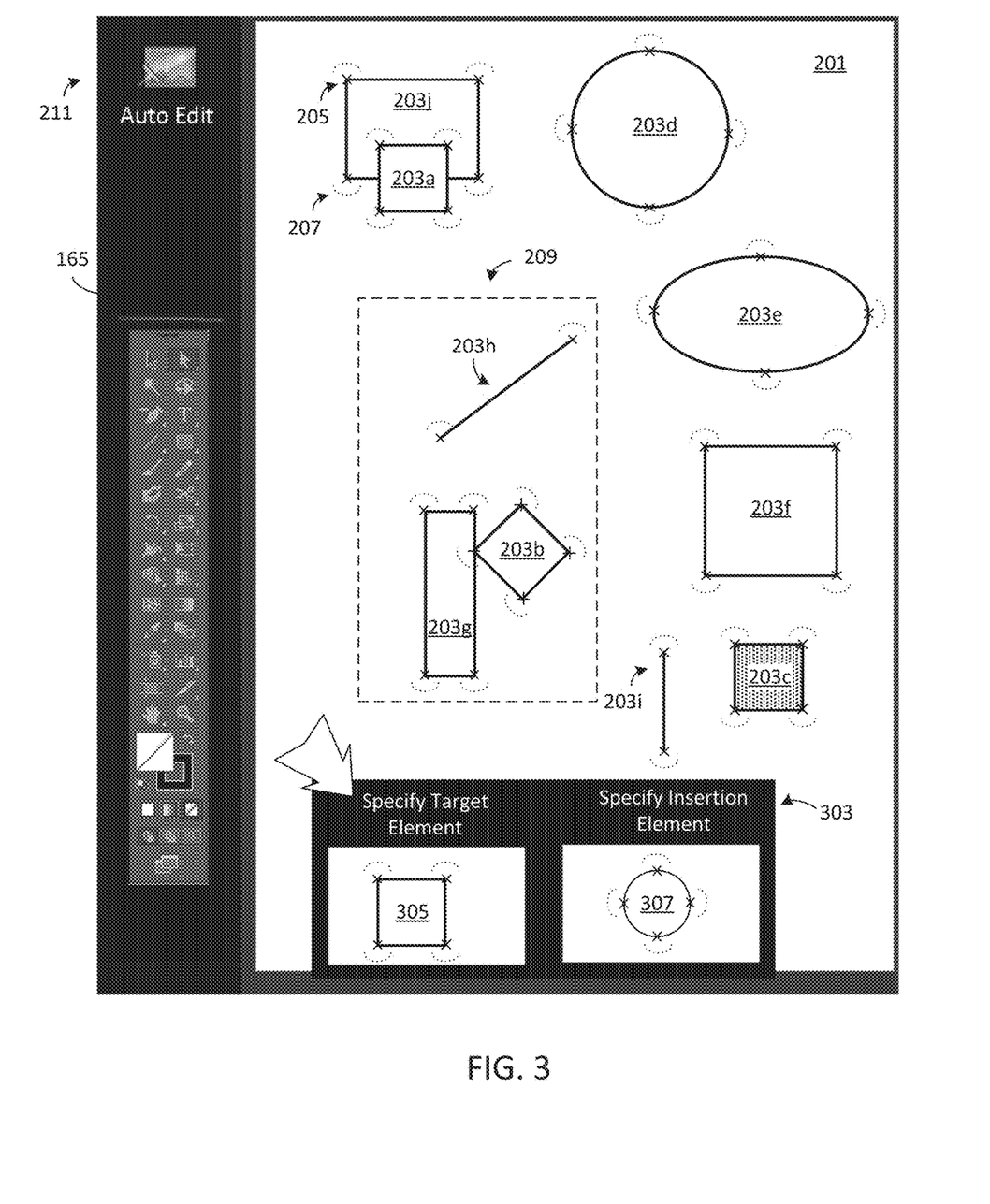
FIG. 3 is a pictorial diagram of another example of a user interface for the document modification engine rendered by a client in the networked environment of FIG. 1 that depicts selection of target and insertion elements for automatically editing the vector graphics document.

As illustrated in FIG. 3, once the user has chosen to automatically edit the document 201 using the document modification engine 121, an element panel 303 is presented in the user interface 165. Using the element panel 303, the user provides input specifying a target element 305 and an insertion element 307. In some embodiments, the target element 305 and the insertion element 307 can be specified by selecting elements 203 from the document (e.g., drag-and-drop), inserting elements from other documents, using copy-and-paste functionality, or other possible operations. Like the elements 203 that make up the document 201, the target element 305 and the insertion element 307 are vector graphics elements that are defined by various parameters that are analyzed by the document modification engine 121. As such, the document modification engine 121 determines that the target element 305 shown in FIG. 3 is a rectangle type having four vertices, each with a handle, and, based on the positions of the vertices, that each of the vertices are separated by a distance of 100 units. Additionally, the stroke color of the target element 305 is black, and its fill color is white. In some embodiments, the target element 305 is further defined by other parameters not discussed in detail herein. In other embodiments, the document modification engine 121 is configured by the user with a default set of parameters to be compared and with a customizable set of parameters to be compared (or ignored).

The document modification engine 121 identifies instances of the elements 203 in the document 201 that match the target element 305 by comparing specific parameters that, at least in part, define the target element 305 (i.e., find vector) to the corresponding parameters that define the elements 203. Examples of the compared parameters include numbers and relative positions of vertices, the presence of handles, stroke color, fill color, or other parameters. In various embodiments, the document modification engine 121 filters the elements 203 on the basis of one parameter of the find vector, then further filtering the set of matching elements 203 by iteratively searching for each remaining parameter of the find vector until any of the elements remaining match the parameters of the target element 305 that are searched.

For example, the target element 305 is a rectangle type. On the basis of this parameter alone, the document modification engine 121 discards elements 203d, 203e, 203h, and 203i from the set of candidate elements to match the target element 305. From the set of elements 203 that remain, only the three elements 203a-c also match the distance of 100 units between the four vertices. Continuing, the same three elements 203a-c also match the handles and the stroke color of the target element 305. However, element 203b is part of the group 209, while the element 203c has a different fill color than the target element 305.

Regarding group membership, in some embodiments, the document modification engine 121 is configured to enable or disable intra-group searching. If intra-group searching is enabled, the document modification engine 121 compares each individual element 203 within a group (e.g., elements 203b, 203g, and 203h in group 209) to the specified parameters of the target element 305 to determine if a match exists. Alternatively, if intra-group searching is disabled, the document modification engine 121 compares the entire group collectively to the target element 305. That is, with intra-group searching disabled, the single target element 305 would fail to match the group 209 because the target element 305 is a single element, not a group of three elements, even though the target element 305 would match with the individual group member element 203*b*.

Regarding fill color, in some embodiments, the document modification engine 121 is configured to enable or disable comparison of one or more parameters, such as fill color. For example, if the fill color parameter is selected for comparison, the document modification engine 121 would not identify the element 203*c* as matching the target element 305 because the fill colors used are different (i.e., the pattern used in the element 203 represents a fill color different than the white fill color of the target element 305). However, if the fill color parameter is not selected for comparison (i.e., fill color is ignored), the document modification engine 121 would identify the element 203*c* as matching the target element 305 if the remaining parameters match except for the ignored fill color.

Continuing, the document modification engine 121 determines, based on identifying the elements 203 having parameters that match the specified parameters of the target element 305 (also referred to as the "matching elements"), the position of each of the matching elements 203 within the document 201. In some embodiments, the position of an element 203 used by the document modification engine 121 is the position stored in the document 201 for the element, such as the (X,Y) coordinates for a center point or a bounding box. In other embodiments, the document modification engine 121 determines a position for each element 203 by, for example, computing a bounding box for the respective element. A bounding box for an element 203 can be computed by determining the maximum and minimum X coordinate values for the element, and determining the maximum and minimum Y coordinate values for the element, whereby the four different combinations of (X,Y) coordinates are the coordinates for the vertices of a bounding box for the element. In some embodiments, the bounding box for an element 203 or a position derived from it (e.g., a center point) is used by the document modification engine 121 as the position for the respective element 203.

Figure 4:
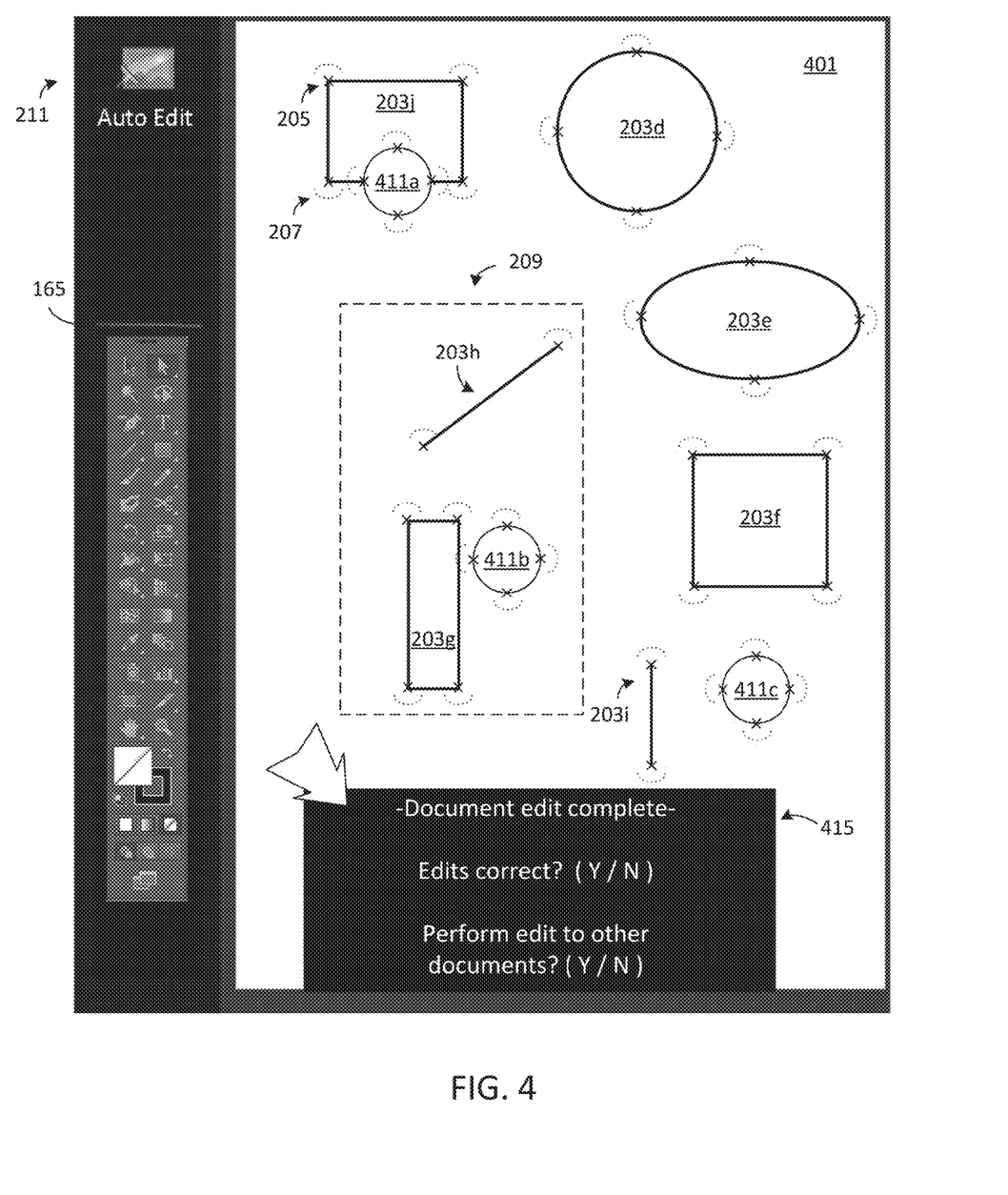
FIG. 4 is a pictorial diagram of another example of a user interface for the document modification engine rendered by a client in the networked environment of FIG. 1 that depicts a result produced by automatically editing the vector graphics document.

Subsequently, the document modification engine 121 places an instance of the insertion element 307 at a position proximate to the position of each one of the previously identified matching elements 203. In an exemplary embodiment, such as shown in FIG. 4, the document modification engine 121 replaces each of the matching elements 203*a-c* in the document 201 with an instance of the insertion element 307, shown in the modified document 401 as replacement elements 411*a-c*. The replacement operation consists of deleting each of the matching elements 203 and inserting an instance of the insertion element 307. In some embodiments, the document modification engine 121 inserts instances of the insertion element 307 proximate to the matching elements 203 (e.g., at a layer above or below) without deleting the matching elements, as is performed in a replacement operation. Whether the insertion element 307 replaces the matching elements 203 in the document 401 or whether the insertion element 307 is merely inserted into the document 401 is configurable.

Thereafter, once the document modification engine 121 has performed the automatic edits, the confirmation panel 415 is presented in the user interface 165. Within the confirmation panel 415, a user indicates whether the automatic edits produced the desired results and, if not, allow further adjustments to be made to the insertions on an individual or collective basis. One possible adjustment to be made is to the alignment used for insertion of the insertion element 307.

Figure 5:
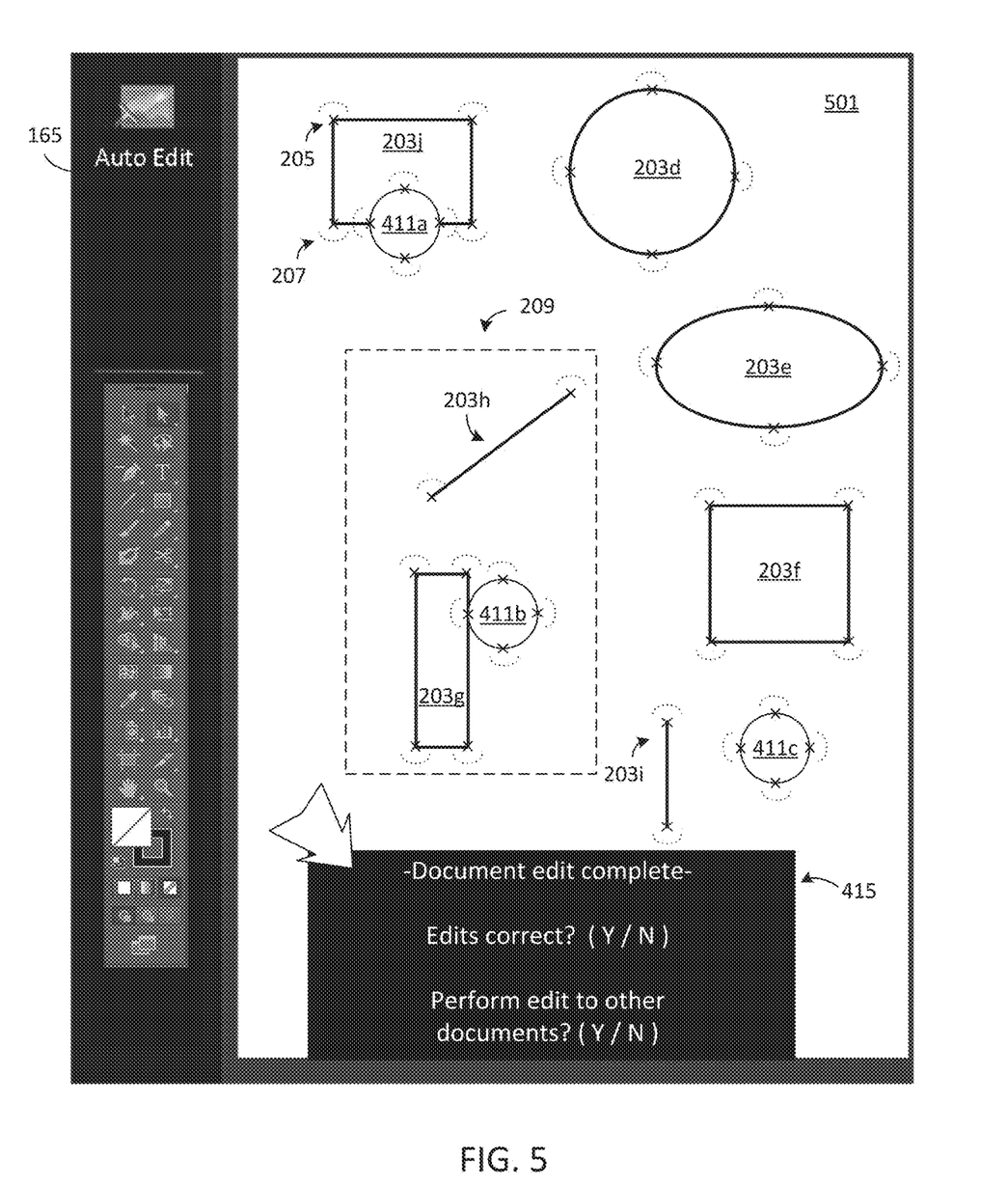
FIG. 5 is a pictorial diagram of another example of a user interface for the document modification engine rendered by a client in the networked environment of FIG. 1 that depicts another result produced by automatically editing the vector graphics document using a different alignment for the insertion element.

For example, as shown in FIG. 4, the center coordinate of each of the replacement elements 411*a-c* was inserted at the position of the center coordinate for the corresponding matching elements 203*a-c*. As a result, depending upon size differences between the particular matching element 203 and the insertion element 307, the alignment of the elements in the modified document 401 can be different, such as the gap now present between element 203*g* and replacement element 411*b* that was not present between elements 203*g* and 203*b* (FIG. 3) in the document 201 prior to the replacement. Consequently, a left-aligned insertion of the element 411*b*, such as shown in the modified document 501 of FIG. 5, aligns the left side of the bounding box of the insertion element 307 with the left side of the bounding box for the corresponding matching element (i.e., element 203*b*). In some embodiments, other alignments are also available, such as top, bottom, and right, in addition to left and center, that determine how the bounding box for the insertion element 307 is aligned with the bounding box for the matching ones of the elements 203. As such, in some instances, the document modification engine 121 is configured with a default alignment to be used for the insertion element 307 (e.g., center), while the user interface 165 receives input (not shown) to adjust the alignment of individual instances of the insertion element inserted.

In some embodiments, the confirmation panel 415 also allows a user to perform the same automatic editing operations, but instead within other specified documents. For example, the document modification engine 121 receives input via the user interface 165 to perform the same type of replacement operations shown in FIGS. 4 and 5 within all of their documents stored in the document library 131.

Figure 6:
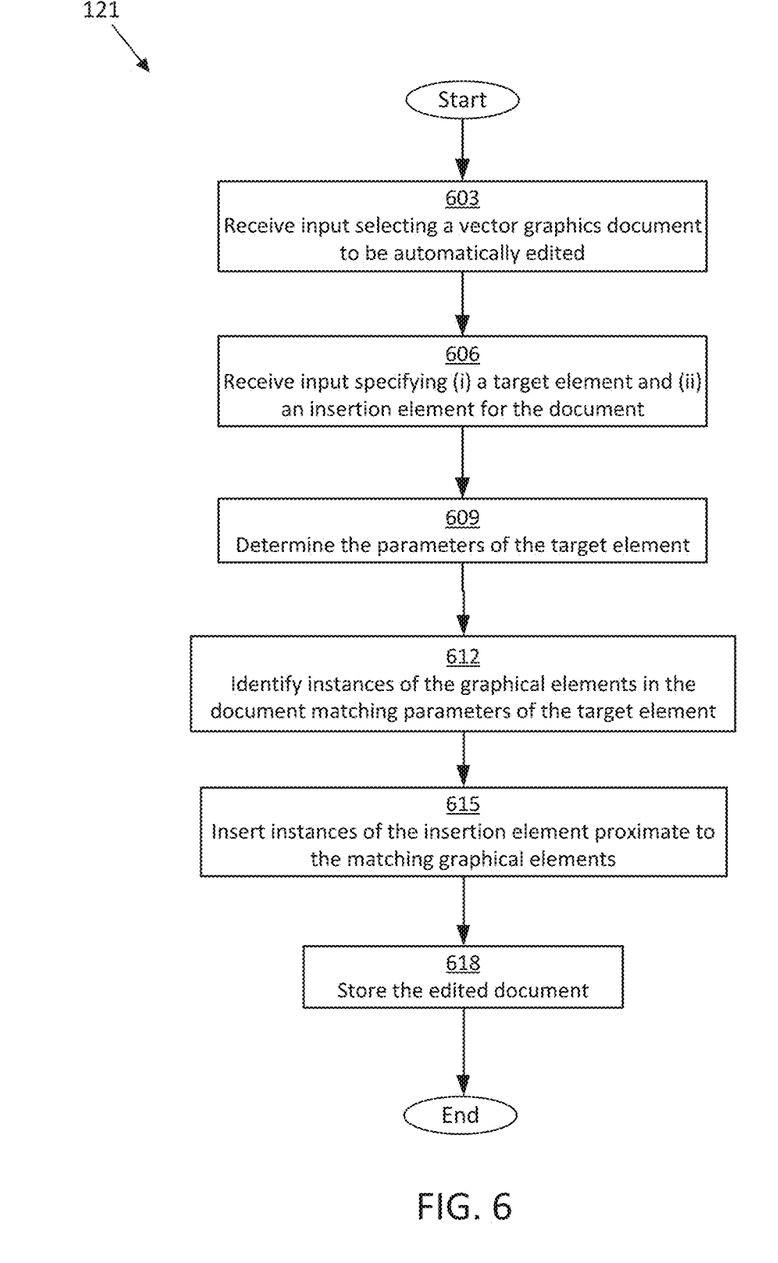
FIG. 6 is a flowchart illustrating an example of a process for editing vector graphics documents by automatically matching target elements with similar elements, according to various embodiments of the present disclosure.

Referring next to FIG. 6, shown is a flowchart that provides one example of the operation of a portion of the document modification engine 121 according to various embodiments. It is understood that the flowchart of FIG. 6 provides merely an example of the many different types of functional arrangements that are possible to implement the operation of the portion of the document modification engine 121 as described herein. As an alternative, the flowchart of FIG. 6 depicts an example of elements of a method implemented in the computing environment 103 according to one or more embodiments. The steps depicted in the flowchart of FIG. 6 are implemented once a user has been authenticated to the document modification engine 121.

Beginning with block 603, the document modification engine 121 receives input selecting a vector graphics document to be edited, such as a user providing input selecting a document from a user interface. The vector graphics document (or simply "document") includes various vector graphics elements, but, in some instances, also includes other content in addition to the vector graphics elements. In some embodiments, the selected document is first created or modified using the document modification engine 121 or other application, chosen from the preexisting documents from the document library 131 that are associated with the user, uploaded from the client 106 through the user interface, or obtained from other possible sources.

In block 606, the document modification engine 121 receives input specifying a target element 305 (FIG. 3) and an insertion element 307 (FIG. 3) to be used for the automatic editing operations. The target element 305 is to serve as a reference by which similar graphical elements 203 in the document will be identified. The insertion element 307 represents the element for which instances will be inserted into the document in the automatic editing operations. In some embodiments, the target element 305 and the insertion element 307 can be specified by selecting elements 203 (FIG. 2) from the document (e.g., drag-and-drop), inserting elements from other documents, using copy-and-paste functionality, or other possible operations. Like the elements 203 that make up the document, the target element 305 and the insertion element 307 are vector graphics elements that are defined by various parameters.

Then, in block 609, the document modification engine 121 determines the parameters that define the specified target element. The parameters of the target element (i.e., find vector) include, for example, the element type (e.g., line, polygon, rectangle, ellipse) and various visual characteristics, such as vertices, handles, stroke color, fill color, stroke weight, stroke pattern, fill pattern, opacity, type of vertex, center point, orientation, or other characteristics. In some embodiments, the document modification engine 121 can be configured by the user with a default set of parameters to be compared and with a customizable set of parameters to be compared (or ignored). For example, if the document modification engine 121 is configured by a user to ignore the fill color parameter, graphical elements in a document are eligible as a match with a target element even if the fill color of the matching elements is different than that of the target element. In further embodiments, the document modification engine 121 can be configured with various options for how the insertion element 307 is to be inserted into the document, such as the alignment (e.g., center, left, right, top, bottom) to be used and whether the insertion element 307 will replace matching elements 203 or if the matching elements 203 will remain.

In various embodiments, the document modification engine 121 is configured to enable or disable intra-group searching. If intra-group searching is enabled, the document modification engine 121 compares each individual element within an element group to the specified parameters of the target element 305 to determine if a match exists. Alternatively, if intra-group searching is disabled, the document modification engine 121 compares the entire group collectively to the target element 305. For example, with intra-group searching disabled, a group of three elements would match with a target element that was the same group of three elements. However, with intra-group searching still disabled, the group of three elements would not match with a target element that was a group of two elements because a group of two is not the same as a group of three.

Continuing, in block 612, the document modification engine 121 identifies instances of the elements 203 in the document that match the target element 305 by comparing specific parameters from the find vector that, at least in part, define the target element 305 to the corresponding parameters that define the elements 203. For example, the parameters from the find vector compared can include vertices (e.g., number and relative positions), the presence of handles, stroke color, fill color, or other parameters. In various embodiments, the document modification engine 121 begins the search by first filtering the elements 203 on the basis of one parameter from the find vector, then further filtering the set of matching elements 203 by iteratively searching for each remaining parameter from the find vector until any of the elements remaining match the parameters of the target element 305 that are searched.

The document modification engine 121 determines, based on identifying the elements 203 having parameters that match the specified parameters of the target element 305 (also referred to as the "matching elements"), the position of each of the matching elements 203 within the document. In some embodiments, the position of an element 203 used by the document modification engine 121 is the position stored in the document for the element, such as the (X,Y) coordinates for a center point or a bounding box. In other embodiments, the document modification engine 121 determines a position for each element 203 by, for example, computing a bounding box for the respective element. In still other embodiments, the bounding box for an element 203 or a position derived from it (e.g., a center point) is used by the document modification engine 121 as the position for the respective element 203.

In block 615, the document modification engine 121 automatically inserts instances of the insertion element 307 at positions proximate to the positions of the previously identified matching elements 203. In various embodiments, the document modification engine 121 replaces the matching elements 203 (e.g., some or all) in the document with instances of the insertion element 307 at positions proximate to the positions of the previously identified matching elements 203 (also referred to as "replacement positions"). The replacement operation consists of deleting the matching elements 203 and inserting instances of the insertion element 307. In some embodiments, the document modification engine 121 inserts instances of the insertion element 307 proximate to the matching elements 203 (also referred to as "insertion positions") without deleting the matching elements, as is performed in a replacement operation. In other embodiments, whether the insertion element 307 replaces the matching elements 203 in the document or whether the insertion element 307 is merely inserted into the document is configurable.

In block 618, the document modification engine 121 stores the edited document in the data store 112 or other possible data stores. In some embodiments, once the document modification engine 121 has performed the automatic edits, the user interface allows the user to indicate whether the automatic edits produced the desired results and, if not, allow further adjustments to be made to the insertions on an individual or collective basis. One possible adjustment to be made is to the alignment used for insertion of the insertion element 307. In further embodiments, the user interface also allows a user to perform the same automatic editing operations on one or more other documents. For example, the document modification engine 121 is configured by a user to perform the same type of replacement operations within all of their documents stored in the document library 131. Thereafter, this portion of the execution of the document modification engine 121 ends as shown.

Figure 7:
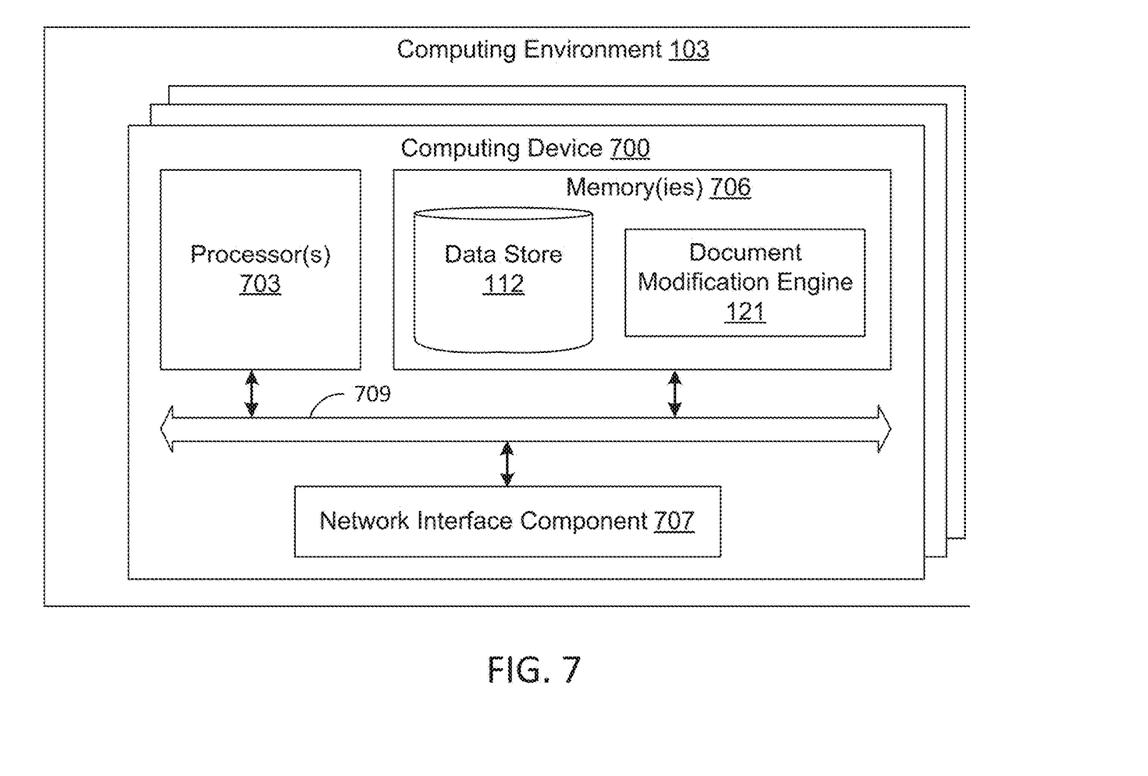
FIG. 7 is a schematic block diagram illustrating an example of a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 700. Each computing device 700 includes at least one processor circuit, for example, having a processor 703, a memory 706, and a network interface 707, all of which are coupled to a local interface 709. To this end, each computing device 700 includes, for example, at least one server computer or like device. The local interface 709 includes, for example, a data bus with an accompanying address/control bus or other bus structure as can be appreciated.

Stored in the memory 706 are both data and several components that are executable by the processor 703. In particular, stored in the memory 706 and executable by the processor 703 is the document modification engine 121, and potentially other applications. Also stored in the memory 706 is a data store 112 and other data. In addition, an operating system is stored in the memory 706 and executable by the processor 703.

It is understood that, in some instances, there are other applications that are stored in the memory 706 and are executable by the processor 703 as can be appreciated. Where any component discussed herein is implemented in the form of software, any one of a number of programming languages are employed such as, for example, C, C++, C#, Objective C, Java®, JavaScript®, Perl, PHP, Visual Basic®, Python®, Ruby, Flash®, or other programming languages. A number of software components are stored in the memory 706 and are executable by the processor 703. In this respect, the term "executable" means a program file that is in a form that can ultimately be run by the processor 703. Examples of executable programs are, for example, a compiled program translated into machine code in a format that can be loaded into a random access portion of the memory 706 and run by the processor 703, source code expressed in proper format such as object code that is capable of being loaded into a random access portion of the memory 706 and executed by the processor 703, or source code interpreted by another executable program to generate instructions in a random access portion of the memory 706 to be executed by the processor 703, etc. An executable program is stored in any portion or component of the memory 706 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 includes, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, or other memory components, or a combination of any two or more of these memory components. In addition, the RAM includes, for example, static random access memory (SRAM), dynamic random access memory (DRAM), or magnetic random access memory (MRAM) and other such devices. The ROM includes, for example, a programmable read-only memory (PROM), an erasable programmable read-only memory (EPROM), an electrically erasable programmable read-only memory (EEPROM), or other like memory device.

Also, the processor 703 represents, in some instances, multiple processors 703 or multiple processor cores, and the memory 706 represents, in some instances, multiple memories 706 that operate in parallel processing circuits, respectively. In such a case, the local interface 709 is an appropriate network that facilitates communication between any two of the multiple processors 703, between any processor 703 and any of the memories 706, or between any two of the memories 706, etc. In some embodiments, the local interface 709 includes additional systems designed to coordinate this communication, including, for example, performing load balancing. The processor 703 is of electrical or of some other available construction.

General

Although, in some embodiments, the document modification engine 121, and other various systems described herein are embodied in software or code executed by general purpose hardware as discussed above, as an alternative, the same is embodied in dedicated hardware or a combination of software/general purpose hardware and dedicated hardware. If embodied in dedicated hardware, each can be implemented as a circuit or state machine that employs any one of or a combination of a number of technologies. These technologies include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the document modification engine 121. If embodied in software, each block represents a module, segment, or portion of code that includes program instructions to implement the specified logical function(s). The program instructions are embodied in the form of source code that includes human-readable statements written in a programming language or machine code that includes numerical instructions recognizable by a suitable execution system such as a processor 703 in a computer system or other system. In some instances, the machine code is converted from the source code, etc. If embodied in hardware, each block represents a circuit or a number of interconnected circuits to implement the specified logical function(s).

Although the flowchart of FIG. 6 shows a specific order of execution, it is understood that, in some embodiments, the order of execution differs from that which is depicted. For example, the order of execution of two or more blocks are scrambled relative to the order shown. Also, in other embodiments, two or more blocks shown in succession in FIG. 6 are executed concurrently or with partial concurrence. Further, in still other embodiments, one or more of the blocks shown in FIG. 6 are skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the document modification engine 121, that includes software or code can be embodied in any non-transitory computer-readable medium for use by or in connection with an instruction execution system such as, for example, a processor 703 in a computer system or other system. In this sense, the logic includes, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, in some embodiments, the computer-readable medium is a random access memory (RAM) including, for example, static random access memory (SRAM) and dynamic random access memory (DRAM), or magnetic random access memory (MRAM). In other embodiments, the computer-readable medium is a read-only memory (ROM), a programmable read-only memory (PROM), an erasable programmable read-only memory (EPROM), an electrically erasable programmable read-only memory (EEPROM), or other type of memory device.

Further, any logic or application described herein, including the document modification engine 121, can be implemented and structured in a variety of ways. For example, one or more applications described are implemented as modules or components of a single application. Further, in some embodiments, one or more applications described herein are executed in shared or separate computing devices or a combination thereof. For example, multiple applications described herein are executed in the same computing device 700, or in multiple computing devices in the same computing environment 103. Additionally, it is understood that terms such as "application," "service," "system," "engine," "module," and so on are interchangeable and are not intended to be limiting.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications to the above-described embodiment(s) are possible without departing substantially from the spirit and principles of the disclosure. All such modifications and variations are intended to be included herein within the scope of this disclosure and protected by the following claims.

Therefore, the following is claimed:

1. A method for automatically editing a vector graphics document having a plurality of graphical elements, the method comprising:
receiving, by a computing device, an input specifying (i) a target element to be identified in the vector graphics document and (ii) an insertion element to be inserted into the vector graphics document;
matching, in the computing device, the graphical elements in the vector graphics document to the target element by comparing a plurality of parameters that define the target element to the parameters that define the graphical elements in the vector graphics document, wherein matching the graphical elements in the vector graphics document to the target element comprises:
retrieving a set of graphical elements in the vector graphics document having respective values for a first parameter from the plurality of parameters that match a value, from the target element, of the first parameter;
modifying the set of graphical elements by at least:
comparing respective values, from the graphical elements, of a second parameter from the plurality of parameters to a value, from the target element, of the second parameter, and
removing, from the set of graphic elements, a non-matching graphical element based on the non-matching graphical element having an additional value of the second parameter that differs from the value, from the target element, of the second parameter; and
returning the set of graphical elements, as modified, as the matched graphical elements; and
replacing, in the vector graphics document and by the computing device, the matched graphical elements with instances of the insertion element, wherein the insertion element and the target element have a difference with respect to at least one of (i) numbers of handles defining the insertion element and the target element or (ii) numbers of vertices defining the insertion element and the target element.

2. The method of claim 1, further comprising presenting a user interface through which the computing device receives the input specifying one or more of the target element and the insertion element.

3. The method of claim 1, wherein said comparing the parameters that define the target element with the parameters that define the graphical elements comprises comparing a first subset of the parameters of the target element and ignoring a second subset of the parameters of the target element.

4. The method of claim 3, wherein the second subset of the parameters are ignored in response to a configuration specified by a user, wherein at least one of the second subset of the parameters is a stroke color or a fill color.

5. The method of claim 1, wherein the target element is an elements group comprising a plurality of graphical element members and each of the graphical elements in the vector graphics document that match the target element is also an elements group having the plurality of graphical element members.

6. The method of claim 1, wherein:
at least one of the graphical elements in the vector graphics document is a member of an elements group; and
said matching the graphical elements in the vector graphics document to the target element comprises:
determining that intra-group searching is enabled, and performing, based on the intra-group searching being enabled, comparisons of members of the elements group, respectively, to the target element, wherein each comparison comprises comparing the plurality of parameters of the target element to respective parameters of a single respective member of the of the elements group.

7. The method of claim 1, wherein:
at least one of the graphical elements in the vector graphics document is a member of an elements group; and
said matching the graphical elements in the vector graphics document to the target element comprises:
determining that intra-group searching is disabled, and performing, based on the intra-group searching being disabled, a comparison of the plurality of parameters of the target element to respective parameters of an entirety of the elements group, wherein the comparison considers the entirety of the elements group as a single element.

8. The method of claim 1, wherein replacing the matched graphical elements with the instances of the insertion element comprises:

identifying a first bounding box enclosing one of the matched graphical elements;
identifying a second bounding box enclosing one of the instances of the insertion element;
identifying a default alignment specified for aligning bounding boxes of the matched graphical elements with bounding boxes of the instances of the insertion element, respectively;
aligning the first bounding box with the second bounding box according to the default alignment;
positioning the one of the instances of the insertion element within the second bounding box as aligned with the first bounding box; and
deleting the one of the matched graphical elements.

9. A non-transitory computer-readable storage medium storing computer-executable program instructions for automatically editing a vector graphics document having a plurality of graphical elements, wherein, when executed by a computing device, the computer-executable program instructions cause the computing device to perform operations comprising:
receiving, in the computing device, an input specifying (i) a target element to be identified in the vector graphics document and (ii) an insertion element to be inserted into the vector graphics document;
matching the graphical elements in the vector graphics document to the target element by comparing a plurality of parameters that define the target element to the parameters that define the graphical elements in the vector graphics document, wherein matching the graphical elements in the vector graphics document to the target element comprises:
retrieving a set of graphical elements in the vector graphics document having respective values for a first parameter from the plurality of parameters that match a value, from the target element, of the first parameter;
modifying the set of graphical elements by at least:
comparing respective values, from the graphical elements, of a second parameter from the plurality of parameters to a value, from the target element, of the second parameter, and
removing, from the set of graphic elements, a non-matching graphical element based on the non-matching graphical element having an additional value of the second parameter that differs from the value, from the target element, of the second parameter; and
returning the set of graphical elements, as modified, as the matched graphical elements; and
inserting, in the computing device, instances of the insertion element in insertion positions proximate to positions of the matched graphical elements or replacement positions that replace the matched graphical elements.

10. The non-transitory computer-readable storage medium of claim 9, the operations further comprising receiving additional input specifying alignment of the insertion element relative to the graphical elements.

11. The non-transitory computer-readable storage medium of claim 9, wherein receiving the input comprises presenting a user interface through which the computing device receives the input specifying the target element and the insertion element.

12. The non-transitory computer-readable storage medium of claim 9, the operations further comprising deleting the graphical elements in the vector graphics document that match the target element.

13. The non-transitory computer-readable storage medium of claim 9, wherein said matching further comprises comparing a first subset of parameters of the target element and ignoring a second subset of the parameters of the target element.

14. The non-transitory computer-readable storage medium of claim 13, wherein the second subset of the parameters are ignored in response to a configuration specified by a user, wherein at least one of the second subset of the parameters is a stroke color or a fill color.

15. The non-transitory computer-readable storage medium of claim 9, wherein:
at least one of the graphical elements in the vector graphics document is a member of an elements group; and
identifying the positions of the graphical elements in the vector graphics document that match the target element comprises one of:
comparing the parameters of the target element to parameters of individual members of the elements group based on intra-group searching being enabled; and
comparing the parameters of the target element to parameters of an entirety of the elements group based on intra-group searching being disabled.

16. A system, comprising:
a memory storing vector graphics document data and computer-executable instructions for automatically editing a vector graphics document having a plurality of graphical elements; and
a computing device communicatively coupled to the memory for executing the computer-executable instructions, wherein executing the computer-executable instructions configures the computing device to perform operations comprising:
receiving an input specifying (i) a target element to be identified in the vector graphics document and (ii) an insertion element to be inserted into the vector graphics document;
matching the graphical elements in the vector graphics document to the target element by comparing a plurality of parameters that define the target element to the parameters that define the graphical elements in the vector graphics document, wherein matching the graphical elements in the vector graphics document to the target element comprises:
retrieving a set of graphical elements in the vector graphics document having respective values for a first parameter from the plurality of parameters that match a value, from the target element, of the first parameter;
modifying the set of graphical elements by at least:
comparing respective values, from the graphical elements, of a second parameter from the plurality of parameters to a value, from the target element, of the second parameter, and
removing, from the set of graphic elements, a non-matching graphical element based on the non-matching graphical element having an additional value of the second parameter that differs from the value, from the target element, of the second parameter; and
returning the set of graphical elements, as modified, as the matched graphical elements; and
inserting instances of the insertion element proximate to positions of the matched graphical elements, wherein the insertion element and the target element have a difference with respect to at least one of (i) numbers of handles defining the insertion element and the target element or (ii) numbers of vertices defining the insertion element and the target element.

17. The system of claim 16, wherein the computer-executable instructions configures the computing device to perform operations further comprising receiving additional input specifying alignment of the insertion element relative to the graphical elements.

18. The system of claim 16, wherein:
- at least one of the graphical elements in the vector graphics document is a member of an elements group; and
- matching the graphical elements in the vector graphics document to the target element further comprises one of:
  - comparing the plurality of parameters of the target element to respective parameters of individual members of the elements group based on intra-group searching being enabled; and
  - comparing the plurality of parameters of the target element to respective parameters of an entirety of the elements group based on intra-group searching being disabled.

19. The system of claim 16, wherein the target element is an elements group comprising a plurality of graphical element members and each of the graphical elements in the vector graphics document that match the target element is also an elements group having the plurality of graphical element members.

* * * * *